United States Patent [19]
Morrison

[11] Patent Number: 5,012,763
[45] Date of Patent: May 7, 1991

[54] PORTABLE AQUABROOD

[76] Inventor: Michael L. Morrison, 8363 Tommy Dr., San Diego, Calif. 92119

[21] Appl. No.: 485,632

[22] Filed: Feb. 27, 1990

[51] Int. Cl.$^5$ ................. A01K 31/20; A01K 41/00
[52] U.S. Cl. ................................. 119/34; 119/41; 119/42; 237/15
[58] Field of Search ............... 119/3, 5, 15, 17, 19, 119/31, 34, 41, 42; 237/15

[56] References Cited

U.S. PATENT DOCUMENTS

| | | | |
|---|---|---|---|
| 616,327 | 12/1898 | Hill | 119/42 |
| 1,016,126 | 1/1912 | Boekel | 119/41 |
| 4,147,131 | 4/1979 | Walker | 119/5 |

*Primary Examiner*—John G. Weiss
*Attorney, Agent, or Firm*—Charles C. Logan, II

[57] ABSTRACT

A portable aquabrood that is formed from an enclosed animal habitat chamber assembly and an enclosed water chamber assembly that are assembled together as a unitary member. The animal habitat chamber assembly has a first upright end wall and a primary bottom wall that are both common walls of the water chamber assembly. The water chamber assembly has a major bottom wall that is spaced a predetermined height below the primary bottom wall thus when the water chamber assembly has a predetermined amount of water in it, that water will directly contact the primary bottom wall and a major protion of the first end wall of the animal habitat chamber assembly. An electric submersible heater is mounted in the interior of the water chamber assembly, it heats the water which warms the air in the chamber. The warmed air passes through the respective common walls to keep recently hatched birds or other animals that need to be kept warm in the animal habitat chamber assembly. There is also a humidity adjustment valve in the upright common end wall of the animal habitat chamber assembly.

8 Claims, 1 Drawing Sheet

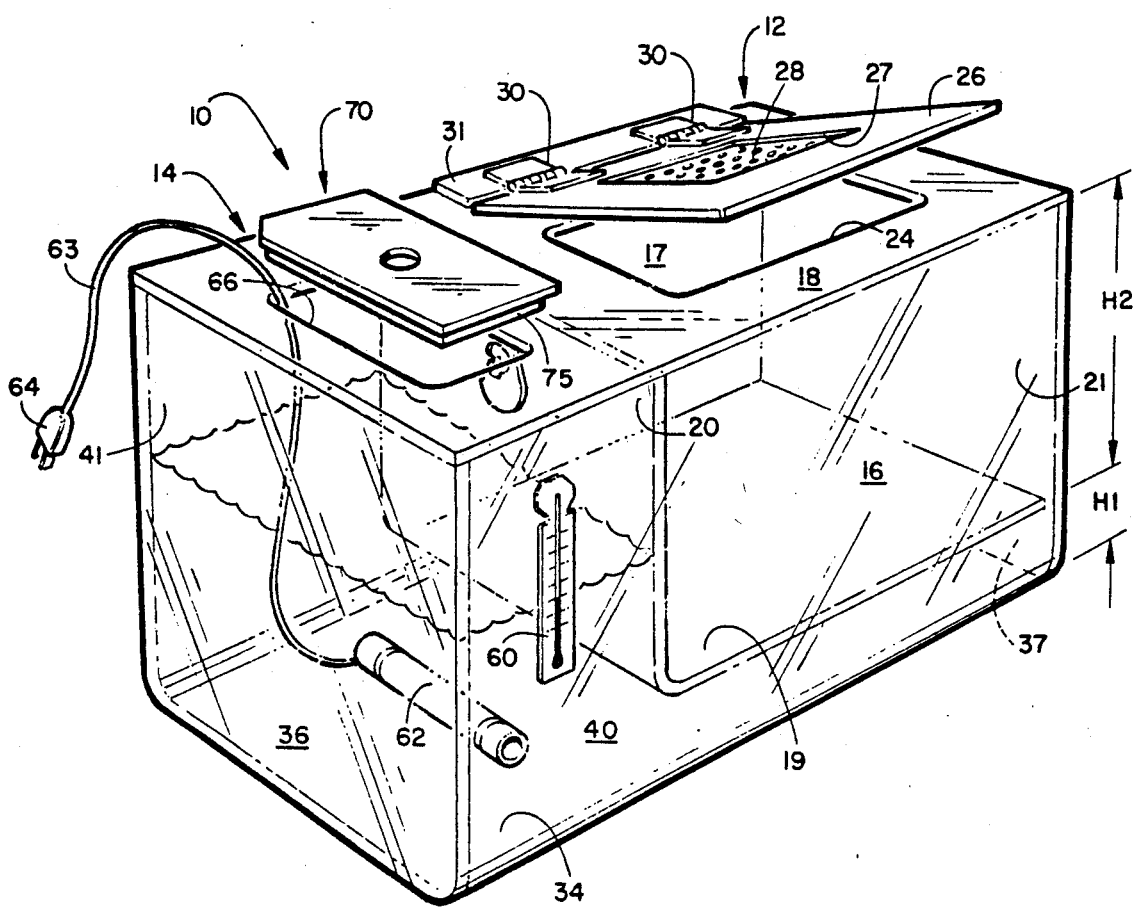
FIGURE 1
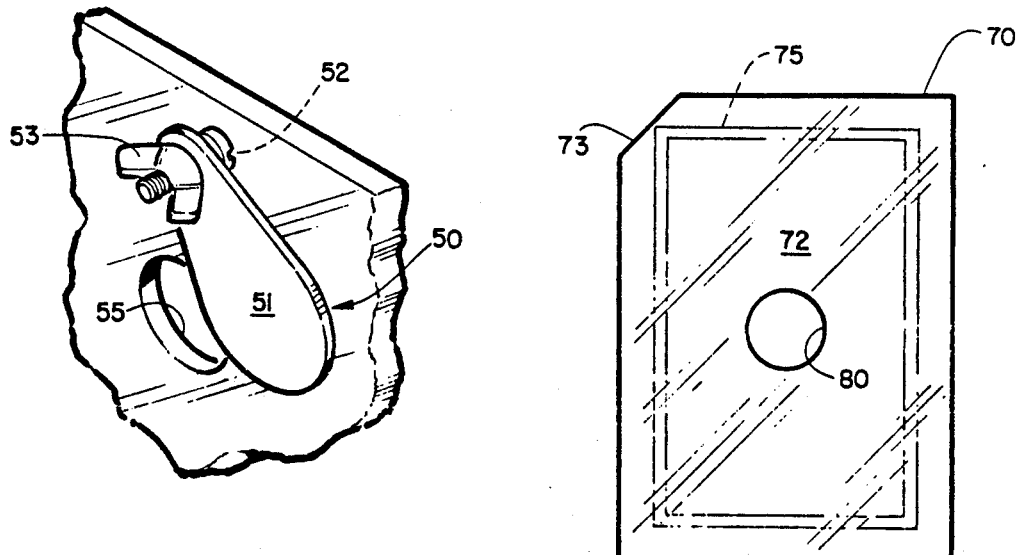
FIGURE 2
FIGURE 3

PORTABLE AQUABROOD

BACKGROUND OF THE INVENTION

The invention relates to structure for housing pets and more specifically to a novel structure that allows the housing to be maintained at a desired temperature to protect the pets health.

There are numerous pet housing structures in existance and some of them have structure for heating their interior to a comfortable temperature for the caged animal. None of these exhibit the unique structure of applicant's device.

It is an object of the invention to provide a novel aquabrood animal habitat that can be used for raising young chicks. The aquabrood may also be used as a pet house or cage for older birds, reptiles, and other small animals.

It is also an object of the invention to provide a novel portable aquabrood that has an enclosed animal habitat chamber assembly that is surrounded on two sides by water that may be heated to a predetermined temperature to maintain the interior of the habitat chamber assembly at a desired temperature.

It is also an object of the invention to provide a novel portable aquabrood that has all of its exterior and interior walls made of clear plastic material.

It is also an object of the invention to provide a novel portable aquabrood that is economical to manufacture and market.

It is also an object of the invention to provide a novel portable aquabrood that allows the person raising chicks to eliminate their need for heating pads and cardboard or wooden boxes.

It is also an object of the invention to provide a novel portable aquabrood that is made of material that can be easily sterilized and has no parts that rust or become contaminated.

It is another object of the invention to provide a novel portable aquabrood that utilizes water to safely heat a persons birds or animals.

It is an additional object of the invention to provide a novel portable aquabrood that is safer than fan driven units that can overheat during power surges.

It is a further object of the invention to provide a novel portable aquabrood that is completely self contained.

SUMMARY OF THE INVENTION

Applicant's novel aquabrood has been designed to be used for the raising of young chicks. It can also be used as a heated cage for the birds after they are older. Reptiles and other animals can also be housed in the aquabrood when using it as a pet house or incubator.

The aquabrood has an enclosed animal habitat chamber assembly and an enclosed water chamber assembly. These two structures have a common end wall and a bottom wall. There is a submersible heater mounted in the water chamber assembly along with a thermometer. An aperture in the common upright end wall of the two assemblies has a valve that can be opened or closed to varying degrees to adjust the humidity in the animal habitat chamber assembly.

The animal habitat chamber assembly has a top wall having an animal access opening. This is closed by a primary cover panel that in turn has a cutout portion that is covered by a perforated panel to allow sufficient air to circulate in the animal habitat chamber assembly.

The portable aquabrood is preferably constructed entirely of plastic thus making sterilization easy. There is no wood, metal or moving parts that can rust or become contaminated.

The aquabrood provides an inexpensive way to maintain chicks at a comfortable temperature. This will allow for raising chicks without heating pads and cardboard or wooden boxes. The unit comes in assorted sizes to accommodate from the smallest species of bird to the larger species of Amazons, Cockatoos and Macaws. The unit utilizes water to safely heat the unit for the birds. It is safer than fan-driven units that can over heat during power surges.

The aquabrood is also completely self contained and utilizes a submersible 50 watt heater. The cost of operating the unit twenty four hours a day, seven days a week for a month in Southern California is approximately $5.00. The temperature and humidity can be easily adjusted.

DESCRIPTION OF THE DRAWING

FIG. 1 is a front perspective view of applicants novel portable aquabrood,

FIG. 2 is a partial front perspective view of the humidity adjustment valve structure of the unit; and FIG. 3 is a top view of the secondary cover member.

DESCRIPTION OF THE PREFERRED EMBODIMENT

The novel portable aquabrood will now be described by referring to FIGS. 1-3 of the drawing. The aquabrood is generally designated numeral 10.

Aquabrood 10 has an enclosed animal habitat chamber assembly 12 and an enclosed water chamber assembly 14. Animal habitat chamber assembly 12 has a front wall 16, a rear wall 17, a top wall 18, a primary bottom wall 19, and laterally spaced end walls 20 and 21. The height of the assembly is H2. An animal access opening 24 is formed in top wall 18 and it is closed by a primary cover panel 26. Primary cover panel 26 has a cutout portion 27 that is covered by a perforated panel 28 that allows air to enter the animal habitat chamber assembly. A pair of hinge assemblies 30 are mounted on a support hinge strip 31 that in turn is secured by a clear bonding agent to top wall 18.

Water chamber assembly 14 has a major bottom wall 34 that is spaced a predetermined height H1 below primary bottom wall 19. It has a left end wall 36 and a right end wall 37 and end wall 20 of the animal habitat chamber assembly is a common wall to both of the two assemblies. Front wall 40 and rear wall 41 are respectively formed of continuous integral sheet members of plastic with the respective front wall 16 and rear wall 17 of the animal habitat chamber assembly. The portable aquabrood is constructed entirely out of Plexiglass material that are attached to each other at their contact surfaces by a clear bonding material. Primary bottom wall 19 and end wall 20 are formed of an integral sheet of Plexigalss material that has been bent to its desired shape. The respective front wall members 16 and 40 and the respective rear wall members 17 and 41 along with major bottom wall 34 are formed of an integral sheet of Plexiglass material that has been bent to its desired shape.

Located adjacent the top edge of end wall 20 is a humidity adjustment valve assembly 50. It has a flat valve panel 51 that pivots about its top end on a bolt 52 having a wing nut 53 for tightening it in a position to cover any desired portion of the humidity adjustmment aperture 55.

A thermometer 60 and a submersible electric heater 62 are mounted in water chamber assembly 14. Cord 63 passes out through cover aperture 66 and it has a plug 64 on its outer end. A secondary cover 70 closes cover aperture 66. Top panel 72 of secondary cover 70 has a relieved corner 73 that allows for passage of the electric cord 63. A closed loop flange 75 extends downwardly from the bottom surface of top panel 72 and nests in cover aperture 66. A finger grip hole 80 is formed in the central portion of top panel 72.

When using the aquabrood, fill the water chamber assembly to approximately one inch from the bottom of the humidity adjustment aperture 55. Allow enough time for the water to heat to the desired temperature. It should be noted the air in the animal habitat chamber assembly is apporximately 10 degrees lower than the water temperature in the small unit only. A temperature adjustment knob is mounted on the submersible heater 62.

What is claimed is:

1. A portable aquabrood comprising:
   an enclosed animal habitat chamber assembly having a first vertical end wall, a second vertical end wall, a front vertical wall, a rear vertical wall, a substantially horizontal top wall, and a substantially horizontally primary bottom wall;
   an animal access opening in one of the walls of said animal habitat chamber assembly, a primary cover panel for said animal access opening, a plurality of air apertures in said primary cover panel that allows air to enter said animal habitat chamber assembly;
   an enclosed water chamber assembly that shares said first vertical end wall and said primary bottom wall as common walls;
   said first vertical end wall having a top end and a humidity adjustment aperture is formed therein adjacent its top end that is in communication with both said animal habitat chamber assembly and said water chamber assembly, a humidity adjustment valve assembly is mounted in said water chamber assembly for closing said humidity adjustment aperture;
   a submersible heater positioned in said water chamber assembly;
   said water chamber assembly having a top wall having a cover aperture, a secondary cover being removably seated in said cover aperture; and
   said water chamber assembly also having a major bottom wall that is spaced a predetermined height H1 below the primary bottom wall of said animal habitat chamber assembly so that when a predetermined amount of water is deposited in said water chamber assembly and it is heated by said submersible heater, the heated water will directly transmit heat into said animal habitat assembly through both of said common walls.

2. A portable aquabrood as recited in claim 1 wherein said enclosed water chamber assembly has a sufficient amount of water in it so that all of said primary bottom wall and a majority of said first end wall of said enclosed animal habitat chamber assembly are in contact with said water.

3. A portable aquabrood as recited in claim 1 further comprising a thermometer mounted in said enclosed water chamber assembly.

4. A portable aquabrood as recited in claim 1 wherein said respective front and rear walls of said animal habitat chamber assembly are each integral members that extend across the entire width of said aquabrood.

5. A portable aquabrood as recited in claim 1 wherein all the exterior and interior walls of said aquabrood are made of clear plastic material.

6. A portable aquabrood as recited in claim 1 wherein said aquabrood has a single integral top wall member that extends across its entire width.

7. A portable aquabrood as recited in claim 4 wherein the front wall, rear wall, and major bottom wall are formed of an integral sheet of plastic material that has been bent into its desired shape.

8. A portable aquabrood as recited in claim 1 wherein the first end wall and the primary bottom wall of said animal habitat chamber assembly are formed of an integral sheet of plastic material that has bent into its desired shape.

* * * * *